June 14, 1927.

H. RITOW 1,632,505

SLIDE RULE

Filed April 16, 1925

*Herman Ritow*
INVENTOR.

Patented June 14, 1927.

1,632,505

UNITED STATES PATENT OFFICE

HERMAN RITOW, OF CHICAGO, ILLINOIS.

SLIDE RULE.

Application filed April 16, 1925. Serial No. 23,483.

My invention relates to improvements in slide rules and the objects of my invention are; first, to provide a very accurate slide rule; second, to provide a slide rule specially adapted to the use of merchants; third, to provide a slide rule for the computation of mathematical quantities involving powers of $e$ (2.7183) and their reciprocals as near unity as desired; fourth, to provide a slide rule for the computation of powers and roots with great convenience; and other objects as will appear from the detailed explanation.

I attain these objects with a novel arrangement of logarithmic scales as illustrated in the accompanying drawing in which—

Similar numerals refer to similar parts throughout the several views.

Figures 1, 2, 3:
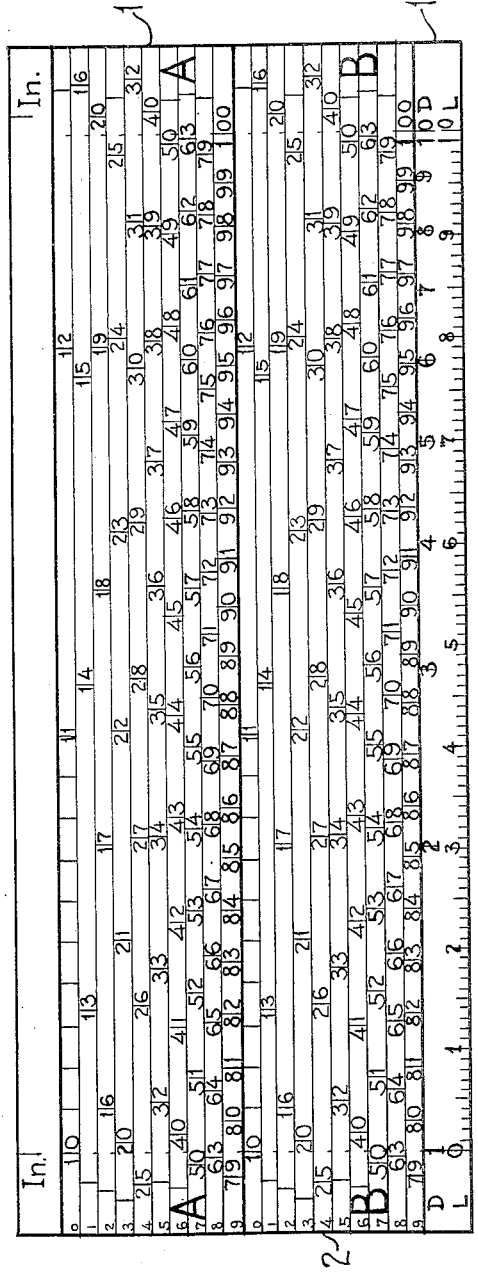
Figure 1 is a top view of the face of the slide rule, showing the scales on the body of the rule and on one face of the slide.
Figure 2 is a view of the bottom or underside of the slide showing the scales thereon.
Figure 3 is a view of the lower edge of the rule, indicating a centimeter scale placed thereon.

The slide rule consists of a body 1, a slide 2 and a runner or indicator, not shown in the drawing. The body and slide coordinate one with the other in the manner—well known in the art—of the Mannheim slide rule. The slide moves to the right or left inside a groove of the body at the will of the operator.

On the body and on the slide the logarithmic scales A, B, C and D, the uniform scales, In, Cm and L and the log-log scales $E^{+x}$ and $E^{-x}$ are marked.

The C and D scales are logarithmic scales identical with the scales well known in the art as the C and D scales of the Mannheim slide rule. The C scale, however, is numbered twice, once in the usual way, and a second time in inverted direction with 0 at the right end progressing toward the left to 10, 20, 30, etc. up to 90 at the left end. The In scale is a uniformly divided inch scale. The Cm scale is a uniformly divided centimeter scale and the L scale is a scale of the graduated length of the rule divided into tenths and hundredths identical with the well known scale of logarithms of the Mannheim slide rule.

The A scale is a logarithmic scale of ten times the graduated length of the rule cut into ten equal lengths placed one below the other with the beginnings and ends of the lengths placed directly in line with the beginning and end of the D scale. The scales are prolonged beyond the beginning and end of each tenth to help in the reading, said prolonged parts duplicating the end of the preceding tenth or the beginning of the succeeding tenth. Each tenth is marked at the left with a small numeral from 0 to 9. The B scale is identical with the A scale.

The $E^{+x}$ scale is a four fold scale plotted in such a way that the readings of the $E^{+x}$ scale opposite the readings of the C scale are the powers of $e$ (2.7183) raised to the index indicated by the C reading. The distance of any graduation of the $E^{+x}$ scale from the beginning line of the C scale is directly proportional to the logarithm to the base 10 of the logarithm to the base $e$ (2.7183) of the reading represented by the graduation. Part of this $E^{+x}$ scale can be found on many slide rules on the market and this part is called the log-log scale.

The $E^{-x}$ scale is a four fold scale plotted in such a way that the readings of the $E^{-x}$ scale opposite the readings of the C scale are the powers of $$\frac{1}{e}\left(\frac{1}{2.7183}\right)$$

raised to the index indicated by the C reading. The distance of any graduation of the $E^{-x}$ scale from the beginning line of the C scale is directly proportional to the logarithm to the base 10 of the minus (—) logarithm to the base $e$ (2.7183) of the reading represented by the graduation.

The method of using the improved slide rule is as follows:—

To multiply or divide with the C and D scales the slide is set bottom up in the groove and the operator proceeds exactly as with most slide rules on the market.

To multiply or divide with the A and B scales, we obtain the approximate answer first with the C and D scales, then proceed in exactly the same manner with the A and B scales but pick out the answer from the ten possible ones under the indicator hairline with the first approximate answer obtained with the C and D scales. We obtain thus an answer ten times as accurately as with the C and D scales, that is one digit or decimal place more.

The more accurate answer must check with the approximate answer obtained with the C and D scales to within one half per cent (½%).

Thus, whereas with the C and D scales we can obtain answers only to three and four decimal places we get them with the A and B scales to four and five decimal places.

The special reverse numbering on the C scale is used in computing discounts. For example to find the price of an object listed at $75.00 a dozen with a discount of 20% and 30%, the usual method would be to multiply $75.00 × 80% × 70% = $42.00.

With the new numbering, which is nothing more than the difference between the true C reading and 100 we would set 1 on the C scale opposite 75 on the D scale, set the indicator over 20 (reverse numbering) then repeat with 1 on the C scale under the indicator, this time moving the latter to 30 of the reverse numbering, thus obtaining the answer of $42.00. This reverse numbering merely saves the time of subtracting the discount in per cent from 100.

To find $e^{+x}$ or $e^{-x}$ (where $e = 2.7183$) set the indicator over $x$ on the C scale and find $e^x$ on the $E^{+x}$ scale $e^{-x}$ on the $E^{-x}$ scale, using in each case the first fold for $x$ between 0.001 and 0.01, the second fold for $x$ between 0.01 and 0.1, the third fold for $x$ between 0.1 and 1 and the fourth fold for $x$ greater than 1.

To find the power or root of any number express the power or root in the form of a decimal, set the left or right end of the D scale opposite the number on the $E^{+x}$ or $E^{-x}$ scale whose power or root is desired and find the power or root on the $E^{+x}$ or $E^{-x}$ scale opposite the index of the power or root on the D scale. The $E^{+x}$ scale should be considered as one long continuous scale of more than four times the graduated length of the rule, cut into four lengths and arranged in such a way that the successive tenth powers or roots of a number appear exactly one under the other on the folded scale.

The same is true of the $E^{-x}$ scale.

Thus, immediately under the reading 2 on the $E^{+x}$ scale we find the reading $1024 = 2^{10}$; immediately over 2 we find $$1.0718 = \sqrt[10]{2} = 2^{1/10}$$

and above that we find $$1.0070 = \sqrt[100]{2} = 2^{1/100}$$

In the same way we find just under 0.5 on the $E^{-x}$ scale $0.0009766 = (0.5)^{10}$ and just over 0.5 we find on the $E^{-x}$ scale $$.9333 = \sqrt[10]{0.5} = (0.5)^{1/10}$$

and above this number we find on the $E^{-x}$ scale $$.99309 = \sqrt[100]{0.5} = (0.5)^{1/100}.$$

In finding a root or power on either scale we must bear in mind that all roots or powers of numbers greater than 1 are found on the $E^{+x}$ scale and that all powers and roots of numbers less than 1 are found on the $E^{-x}$ scale; that roots of a number, that is, powers whose indices are less than 1, such as 2/3 (0.667) powers, are found to the left of the number on the same fold or somewhere on the folds of the log-log scale above the number; and that powers whose indices are greater than 1, such as three-halves (3/2 or 1.5) powers, are found to the right of the number on the same fold or somewhere on folds of the log-log scale below the number.

A second way of finding the root of a number is to go through the same process as division with the C and D scales but using the log-log scale ($E^{+x}$ or $E^{-x}$) in place of the C scale and apparently dividing the number whose root is wanted by the degree of the root,—for example by three for cube root, by two for square root, etc., and finding the answer on the same fold of the log-log scale opposite the left end of the D scale or finding it on a fold above the number opposite the right end of the D scale.

Logarithms can be found in the usual way with the D and L scales to three places. A more accurate determination of logarithms can be obtained by reading from the A to the L scales. The indicator is set at the number on the A scale and the numeral at the left of the fold upon which the number is found is the first figure of the mantissa, the reading of the L scale provides the next three and sometimes four figures. The logarithms are thus obtained to at least four places.

For example to find the mantissa of the logarithm of 70 the indicator is set over the graduation 70 on the scale A. 70 is found on fold numbered 8 at the left. The hairline will cover the reading 4510 on the L scale. The mantissa of the logarithm of 70 is therefore .84510, the first figure 8 being the number of the fold, and the remaining figures 4510 being the reading of the L scale. A second method involving a check is to first set the indicator on the D scale over the number whose logarithm is desired, obtaining thus the first three figures from the L scale, then set the indicator over the same number on the A scale and read the L scale for the second, third, fourth and fifth decimal figures of the mantissa. Thus for the logarithm of 70 the indicator covering 7 on on the D scale will read .845 on the L scale and again the indicator covering 70 on the A scale will read 4510 on the L scale thus checking the second and third decimals and adding two more. The logarithm of 70 is .84510 (1 for the characteristic).

Corresponding numbers appearing at the same time under the hairline of the indicator on corresponding folds of the $E^{+x}$ and $E^{-x}$ scales are reciprocals.

For the banker, the statistician, the insurance computer, the financier, the public accountant, the mathematician and the merchant, the improved slide rule is of greatest use because it can compute compound interest very simply [application of the formula compound interest = (1 + rate of interest) raised to the power of the number of years or parts of a year used for compounding the interest]; because with it one can quickly and easily find the powers and roots of any number from 0.00001 to 100000.; because one can find the powers and roots of $e$ (2.7183) so useful in Napierean logarithms, hyperbolic functions, catenary equation etc. etc.; because the computation of percent and in particular of discounts is greatly simplified, and because it gives ordinary multiplication and division with an error of less than 1 in 5000 or 1/20%, together with a check in each operation.

The combination of the folded and single length logarithmic scale was patented January 31, 1922 by the applicant and he, therefore, does not claim this combination in general as novel.

But the specific combination of a tenfold scale with the single length scale with the numerals at one end provides a particularly simple method of finding logarithms accurately and this feature is novel over the general claims of the applicant's patent of January 31, 1922.

Scales the graduations of which were placed at distances from the left proportional to the logarithm of the logarithm of the readings are common on slide rules and are known in the art as log-log scales, but such scales have never been made to read from 1.001 to 1.01, some of said log-log scales beginning at 1.01, some at 1.1.

The additional length of scale from 1.001 to 1.01 makes it possible to use the scale in in the computations involving compound interest as for these problems the compounding takes place frequently every quarter of a year at an annual rate of sometimes 3% or less or at a rate between dates of compounding the interest of 0.75% or less.

This additional length of scale reading from 1.001 to 1.01 can also be used for all numbers between 1 and 1.001 since the prolonged scale in that direction is practically a repetition of folds almost identical with the novel additional length from 1.001 to 1.01 with the exception that each new length has an added 0 between the 1 and the decimal numbers as the scale comes nearer to 1. Thus the first imagined prolonged length would read from 1.0001 to 1.001, the next from 1.00001 to 1.0001 and so on, all the imagined added lengths, however, having the same graduations. The new length from 1.001 to 1.01, therefore, can be used for all numbers all the way back to almost unity if desired.

For example over 2 on the C scale we find on the first fold of the $E^{+x}$ scale the reading 1.00202. Now $1.00202 = e^{.0002}$, but $1.000202 = e^{.0002}$, and $1.0000202 = e^{.00002}$ and so on. That is we can use this first fold of the $E^{+x}$ scale as though it continued indefinitely repeating itself fold after fold, each succeeding fold nearer 1 having an additional zero between the decimal point and the readings. It is readily seen that there are as many zeros in the reading after the decimal point as there are zeros in the index of the power to which $e$ is raised. That makes it a very simple matter to use this fold for any power of $e$ near unity, no matter how near to 1 the power may be. This length of the $E^{+x}$ scale reading from 1.001 to 1.01 greatly increases the value of the log-log scale making it indefinitely long.

For similar mathematical reasons the $E^{-x}$ scale provides quick computation of problems involving compound interest such as annuities, amortization rates, etc. and at the same time can be used if desired for all numbers less than 1, again almost all the way to unity, since the length of $E^{-x}$ scale reading from 0.999 to 0.99 is practically identical in graduations with an $E^{-x}$ scale reading from 0.9999 to 0.999 or to an $E^{-x}$ scale reading from 0.99999 to 0.9999 etc. indefinitely.

For example over 2 on the C scale we find on the first fold of the $E^{+x}$ scale the reading 0.998002 and $e^{-0.002} = 0.998002$. Also $e^{-0.0002} = 0.9998002$, $e^{-0.00002} = 0.99998002$ and so on. It is readily seen that there are as many nines after the decimal point of the power as there are zeros after the decimal point of the index of the power. This, again makes it simple to use the top fold of the $E^{+x}$ scale indefinitely as near to unity as desired.

The new discount numbering of the C scale in reversed direction, is not novel having been previously used by at least one other inventor.

I claim as my invention:

1. In a slide rule the combination of a logarithmic scale of ten times the graduated length of the rule, cut into ten equal lengths or folds placed one below the other and numbered successively 0, 1, 2, 3, 4, 5, 6, 7, 8, 9, with a uniformly graduated scale of the graduated length of the rule, said ten fold logarithmic scale corresponding with said uniformly graduated scale so that the logarithm of any reading on said ten fold scale is found by writing after the decimal point the number of the fold followed by the reading of the uniform scale directly opposite the said reading of the ten fold scale.

2. In a slide rule the combination of a logarithmic scale of ten times the graduated length of the rule, cut into ten equal lengths or folds placed one below the other, with a logarithmic scale of the graduated length of the rule, and with a uniformly graduated scale of the graduated length of the rule, said three scales corresponding with each other, so that the logarithm of a number can be found to three places by reading the uniform scale directly opposite the number on the single length scale, and so that the logarithm of the same said number can be found to the second, third, fourth and more decimal places by reading the said uniform scale opposite the said number on the ten fold scale.

3. In a slide rule the combination of a first logarithmic scale of the graduated length of the rule with a second logarithmic scale graduated so that the readings of the graduations are the powers of $e=2.7183$ raised to indices from 0.001 to 0.01 or from 0.0001 to 0.001 or from 0.00001 to 0.0001 and so on ad infinitum said powers being found on the second scale directly opposite the corresponding indices on the first scale, and said powers possessing as many zeros after the decimal point as the corresponding indices.

4. In a slide rule the combination of a first logarithmic scale of the graduated length of the rule with a second logarithmic scale graduated so that the readings are the powers of $$\frac{1}{e} = \frac{1}{2.7183}$$

raised to indices from 0.001 to 0.01, or from 0.0001 to 0.001, or from 0.00001 to 0.0001 and so on ad infinitum said powers being found on the second scale directly opposite the corresponding indices on the first scale and said powers possessing as many nines after the decimal point as there are zeros after the decimal points of the corresponding indices.

5. In a slide rule the combination of a first logarithmic scale of the graduated length of the rule with a second logarithmic scale and a third logarithmic scale all corresponding with one another so that opposite any index reading of the first scale the positive power of $e=2.7183$ raised to the given index will be found on the said second logarithmic scale and the negative power of $e$ 2.7183 raised to the same said index but negative, will be found on the said third logarithmic scale.

Signed at Chicago, county of Cook and State of Illinois, this twenty-sixth day of March, 1925.

HERMAN RITOW.